United States Patent
Yoon et al.

(10) Patent No.: US 10,483,550 B2
(45) Date of Patent: Nov. 19, 2019

(54) HIGH TEMPERATURE SOLID OXIDE CELL COMPRISING DIFFUSION BARRIER LAYER AND METHOD FOR MANUFACTURING THE SAME

(71) Applicant: KOREA INSTITUTE OF SCIENCE AND TECHNOLOGY, Seoul (KR)

(72) Inventors: Kyung Joong Yoon, Seoul (KR); Seung-Hwan Lee, Seoul (KR); Mansoo Park, Seoul (KR); Jongsup Hong, Seoul (KR); Hyoungchul Kim, Seoul (KR); Ji-Won Son, Seoul (KR); Jong Ho Lee, Seoul (KR); Byung Kook Kim, Seoul (KR); Hae-Weon Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 127 days.

(21) Appl. No.: 15/630,471

(22) Filed: Jun. 22, 2017

(65) Prior Publication Data

US 2018/0166692 A1    Jun. 14, 2018

(30) Foreign Application Priority Data

Dec. 13, 2016 (KR) ........................ 10-2016-0169310

(51) Int. Cl.
*H01M 4/88* (2006.01)
*H01M 4/90* (2006.01)
(Continued)

(52) U.S. Cl.
CPC ....... *H01M 4/8807* (2013.01); *H01M 4/8889* (2013.01); *H01M 4/9033* (2013.01); *H01M 8/1253* (2013.01); *H01M 2008/1293* (2013.01)

(58) Field of Classification Search
CPC ............ H01M 8/12; H01M 8/04; H01M 4/88; H01M 4/90
See application file for complete search history.

(56) References Cited

U.S. PATENT DOCUMENTS

| | | | |
|---|---|---|---|
| 6,287,716 B1 * | 9/2001 | Hashimoto ......... | H01M 4/9033 429/482 |
| 2002/0197524 A1 * | 12/2002 | Xie ..................... | H01M 4/8605 429/530 |

(Continued)

FOREIGN PATENT DOCUMENTS

| JP | 2005-327507 A | 11/2005 |
|---|---|---|
| JP | 2008-078126 A | 4/2008 |

(Continued)

*Primary Examiner* — Kenneth J Douyette
(74) *Attorney, Agent, or Firm* — Rabin & Berdo, P.C.

(57) ABSTRACT

Provided is a solid oxide cell including a fuel electrode layer, electrolyte layer and an air electrode layer, wherein a diffusion barrier layer is provided between the air electrode layer and the electrolyte layer, the diffusion barrier layer includes: a first diffusion barrier layer formed on the electrolyte layer and including a sintered ceria-based metal oxide containing no sintering aid; and a second diffusion barrier layer formed on the first diffusion barrier layer and including a sintered product of a ceria-based metal oxide mixed with a sintering aid, the first diffusion barrier layer includes a sintered product of nanopowder and macropowder of a ceria-based metal oxide, and the first diffusion barrier layer and the second diffusion barrier layer are sintered at the same time. The diffusion barrier layer is densified, shows high interfacial binding force and prevents formation of a secondary phase derived from chemical reaction with the electrolyte.

10 Claims, 12 Drawing Sheets

(51) Int. Cl.
*H01M 8/12* (2016.01)
*H01M 8/1253* (2016.01)
*H01M 8/124* (2016.01)

(56) References Cited

U.S. PATENT DOCUMENTS

| | | | |
|---|---|---|---|
| 2012/0225368 A1* | 9/2012 | Ohmori | H01M 4/9033 |
| | | | 429/481 |
| 2014/0045097 A1* | 2/2014 | Min | H01M 8/0254 |
| | | | 429/517 |

FOREIGN PATENT DOCUMENTS

| | | |
|---|---|---|
| JP | 2010-257738 A | 11/2010 |
| JP | 2011-507161 A | 3/2011 |
| JP | 2012-195281 A | 10/2012 |
| JP | 2013-093177 A | 5/2013 |
| JP | 2013-197036 A | 9/2013 |
| JP | 2015-062175 A | 4/2015 |
| JP | 2016-054146 A | 4/2016 |
| JP | 2016-066568 A | 4/2016 |
| KR | 10-1052739 B1 | 7/2011 |
| KR | 10-2014-0048738 A | 4/2014 |
| KR | 10-2015-0123527 A | 11/2015 |
| WO | WO 2008/023805 A1 | 2/2008 |

\* cited by examiner

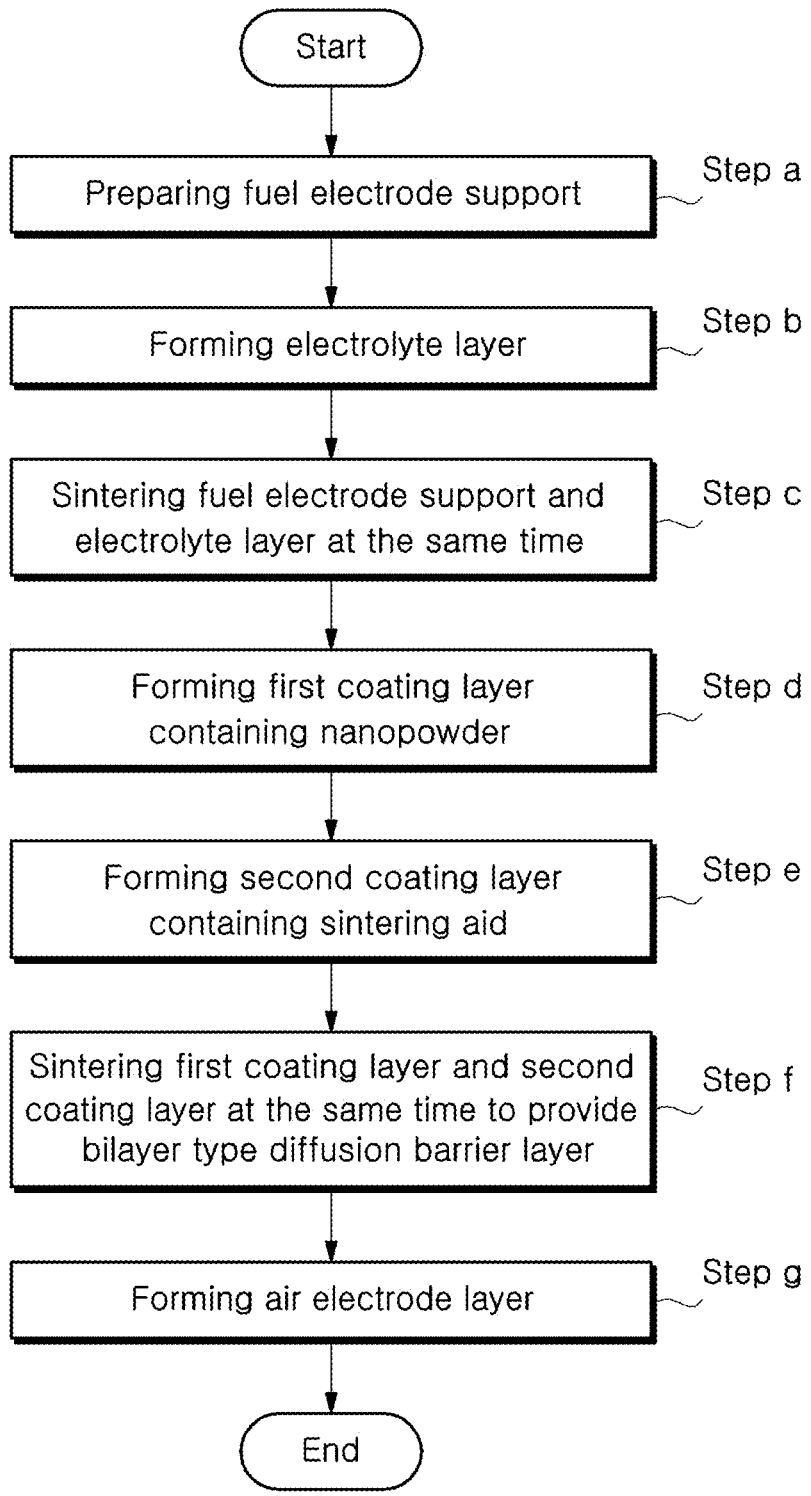

HIGH TEMPERATURE SOLID OXIDE CELL COMPRISING DIFFUSION BARRIER LAYER AND METHOD FOR MANUFACTURING THE SAME

CROSS-REFERENCE TO RELATED APPLICATIONS

This application claims priority under 35 U.S.C. § 119 to Korean Patent Application No. 10-2016-0169310 filed on Dec. 13, 2016 in the Korean Intellectual Property Office, the disclosure of which is incorporated herein by reference in its entirety.

TECHNICAL FIELD

The following disclosure relates to a solid oxide cell including a diffusion barrier layer. More particularly, the following disclosure relates to a solid oxide cell including a diffusion barrier layer which includes a ceria-based metal oxide and a sintering aid, and a method for manufacturing the same.

BACKGROUND

A solid oxide fuel cell (SOFC) is a high-efficiency electrochemical power generation system which converts chemical energy of fuel gas directly into electrical energy, and uses an ion conductive solid oxide as an electrolyte. In addition, a solid oxide electrolysis cell (SOEC) based on the reverse reaction process of the above process uses the surplus power to produce chemical fuel.

Solid oxide cells such as a solid oxide fuel cell and a solid oxide electrolysis cell may share various technological bases with each other, including a device structure, operation method, or the like. In other words, most part of the materials and processing technologies of a fuel cell may be used directly for an electrolysis cell.

A single cell of a solid oxide fuel cell and electrolysis cell is composed of the electrolyte, fuel electrode and air electrode. In the case of a solid oxide fuel cell, oxygen and fuel are supplied to the air electrode and fuel electrodes, respectively, so that reduction of oxygen occurs at the air electrode to produce oxygen anions which are transferred to the fuel electrode through the electrolyte, and the fuel reacts with oxygen ions to cause oxidation into water at the fuel electrode while releasing electrons to the external circuit to produce electric power. In the case of a solid oxide electrolysis cell, when hot steam is supplied to the fuel electrode and electricity is applied, water is electrolyzed to produce hydrogen and oxygen and oxygen ions are transferred to the air electrode through the electrolyte, so that pure hydrogen is produced at the fuel electrode and oxygen is produced at the air electrode, separately.

All the cell components of solid oxide fuel cells and solid oxide electrolysis cells, including electrolyte and electrodes, possess excellent thermal properties. In addition, since such a solid oxide fuel cell and solid oxide electrolysis cell are operated at high temperature, they have higher efficiency and quality as compared to a low-temperature fuel cell and electrolysis cell.

However, the solid oxide fuel cell and solid oxide electrolysis cell should be exposed to high temperature for a long time when they are manufactured and operated, which causes various deterioration phenomena. Thus, it is difficult to commercialize such cells. More particularly, chemical reaction between an air electrode layer having a composition, such as $Ba_{1-x}Sr_xCo_{1-y}Fe_yO_3$ (BSCF) or $La_{1-x}Sr_xCo_{1-y}Fe_yO_3$ (LSCF), and a zirconia-based electrolyte layer causes formation of insulating reaction products at the interface, resulting in an increase in resistance and degradation of the cell quality. Moreover, degradation of thermo-mechanical stability may occur due to a difference in thermal expansion coefficients between the air electrode/electrolyte and reaction products.

Therefore, many studies have been conducted for preventing the reaction between an air electrode layer and an electrolyte layer in order to improve the quality and stability of a solid oxide cell, such as a solid oxide fuel cell or solid oxide electrolysis cell. Particularly, there is a method for forming a ceria-based diffusion barrier layer between an air electrode and electrolyte. However, a ceria-based material has poor sintering property and requires a high-temperature process at 1400° C. or higher to accomplish densification. In this case, the ceria-based material may cause chemical reaction with a zirconia-based electrolyte and thus requires sintering at a temperature of 1250° C. or lower. However, in this case, a densification degree may be degraded and a significant amount of pores is formed. Thus, it is not possible to prevent the diffusion of some of the elements from the air electrode layer to the electrolyte layer through the pores.

Under these circumstances, it is required to develop a technology which allows sintering at a temperature of 1250° C. or lower to form a dense diffusion barrier layer with high bonding strength to inhibit the diffusion of Sr from a positive electrode (air electrode), and ultimately improves the efficiency and stability of a solid oxide cell.

REFERENCES

Patent Documents

Korean Patent Publication No. 1052739
Japanese Laid-Open Patent No. 2013-197036

SUMMARY

An embodiment of the present disclosure is directed to providing a diffusion barrier layer, which is densified, has high interfacial binding force and prevents formation of a secondary phase derived from chemical reaction with an electrolyte, through sintering at a temperature of 1250° C. or lower, in order to improve the efficiency and stability of a solid oxide cell using the same significantly.

In one aspect, there is provided a solid oxide cell including an fuel electrode layer, electrolyte layer and an air electrode layer, wherein a diffusion barrier layer is provided between the air electrode layer and the electrolyte layer, the diffusion barrier layer includes: a first diffusion barrier layer formed on the electrolyte layer and including a sintered ceria-based metal oxide containing no sintering aid; and a second diffusion barrier layer formed on the first diffusion barrier layer and including a sintered product of a ceria-based metal oxide mixed with a sintering aid, the first diffusion barrier layer includes a sintered product of nanopowder and macropowder of a ceria-based metal oxide, and the first diffusion barrier layer and the second diffusion barrier layer are sintered at the same time.

The first diffusion barrier layer may include a sintered product of nanopowder and macropowder of a ceria-based metal oxide.

The sintered product of nanopowder may be present in an amount of 5-50 wt % based on the total weight of the first diffusion barrier layer.

The ceria-based metal oxide may include at least one selected from the group consisting of gadolinium (Gd), samarium (Sm), yttrium (Y) and lanthanum (La).

The ceria-based metal oxide may be represented by the following Chemical Formula 1:

$$Ln_xCe_{1-x}O_{2-0.5x} \quad \text{[Chemical Formula 1]}$$

wherein Ln is any one selected from the group consisting of gadolinium (Gd), samarium (Sm), yttrium (Y) and lanthanum (La), and x satisfies $0<x=0.4$.

The sintering aid may be at least one selected from Co, Fe, Ni, Zn, Cu, Mn and Li or an oxide thereof.

The sintering aid may be used in an amount of 0.05-5 wt % based on the total weight of the second diffusion barrier layer.

The air electrode layer may have a perovskite structure.

The air electrode layer may include at least one selected from lanthanum (La), cobalt (Co) and iron (Fe).

The electrolyte layer may include a zirconia-based metal oxide.

The second diffusion barrier layer may include a sintered product of nanopowder and macropowder of a ceria-based metal oxide.

The first diffusion barrier layer or the second diffusion barrier layer may have a thickness of 1-10 μm.

The air electrode layer may include an air electrode functional layer formed on the second diffusion barrier layer and an air electrode current collector layer formed on the air electrode functional layer.

In another aspect, there is provided a method for manufacturing a solid oxide cell, including the steps of:

(a) preparing a fuel electrode support;

(b) coating an electrolyte layer on the fuel electrode support;

(c) sintering the fuel electrode support and the electrolyte layer at the same time;

(d) coating a paste containing nanopowder and macropowder of a ceria-based metal oxide on the electrolyte layer to form a first coating layer;

(e) coating a mixed paste containing a ceria-based metal oxide and a sintering aid on the first coating layer to form a second coating layer;

(f) sintering the first coating layer and the second coating layer at the same time to provide a bilayer type diffusion barrier layer including a first diffusion barrier layer and a second diffusion barrier layer formed on the first diffusion barrier layer; and (g) forming an air electrode layer on the bilayer type diffusion barrier layer.

The nanopowder may be present in an amount of 5-50 wt % based on the total weight of the first coating layer.

The nanopowder may have an average particle diameter of 10-100 nm.

The macropowder may have an average particle diameter of 100 nm-1 μm.

The method may further include forming a fuel electrode functional layer on the fuel electrode support, after step (a).

The ceria-based metal oxide contained in the second coating layer of step (e) may be a mixture of nanopowder with macropowder.

The nanopowder may be used in an amount of 5-50 wt % based on the total weight of the second coating layer.

The sintering aid may be present in an amount of 0.05-5 wt % based on the total weight of the second coating layer.

The sintering of step (f) may be carried out at a temperature of 1000-1250° C.

Step (g) may be carried out by forming an air electrode functional layer on the second diffusion barrier layer and then forming an air electrode collector layer on the air electrode functional layer.

The solid oxide cell disclosed herein includes a first diffusion barrier layer containing nanopowder that is in contact with an electrolyte layer and containing no sintering aid, and a second diffusion barrier layer containing a sintering aid and formed on the first diffusion barrier layer. In addition, the bilayer type diffusion barrier layer is sintered at the same time at low temperature to provide a densified structure and high interfacial bonding force and to prevent formation of a secondary phase derived from chemical reaction with an electrolyte. Thus, it is possible to improve the efficiency and stability of a solid oxide cell significantly.

BRIEF DESCRIPTION OF THE DRAWINGS

FIG. 2 is a flow chart illustrating the method for manufacturing a solid oxide cell according to an embodiment.

DETAILED DESCRIPTION OF EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
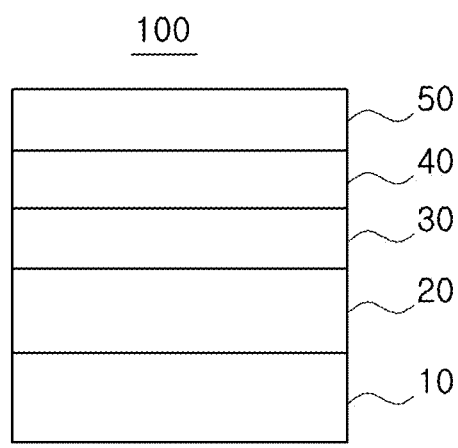
FIG. 1 is a lateral sectional view of the solid oxide cell according to an embodiment.

FIG. 1 is a schematic view of the lateral section of the solid oxide cell according to an embodiment. Hereinafter, the solid oxide cell according to the present disclosure will be explained in more detail with reference to FIG. 1.

The solid oxide cell 100 according to an embodiment includes a fuel electrode layer 10, electrolyte layer 20 and an air electrode layer 50. In addition, diffusion barrier layer 30, 40 is provided between the air electrode layer 50 and the electrolyte layer 20. The diffusion barrier layer 30, 40 may include a first diffusion barrier layer 30 and a second diffusion barrier layer 40 successively on the electrolyte layer 20.

Particularly, the fuel electrode layer 10 may function to carry out electrochemical reaction of fuel and to transport charges. Therefore, the fuel oxidation property of the fuel electrode catalyst is important. In this context, it is preferred to use a fuel electrode catalyst which is chemically stable upon the contact with the materials forming an electrolyte layer 20 and has a thermal expansion coefficient similar to that of the materials.

The materials forming the fuel electrode layer 10 may include zirconia-based metal oxides containing a pure metal catalyst, such as Ni, Co, Ru or Pt, and particular examples thereof may include Ni/YSZ (yttria-stabilized zirconia composite) or Ru/YSZ composite. In addition, the fuel electrode layer 10 may have a porous structure so that fuel gas may be diffused well thereto.

The electrolyte layer 20 may include a zirconia-based metal oxide. More particularly, the electrolyte layer may include yttria-stabilized zirconia (YSZ) or Scandia-stabilized zirconia (ScSZ).

In addition, the electrolyte layer 20 should be densified so that air may not be mixed with fuel, and may have high oxygen ion conductivity and low electron conductivity. In addition, since a significantly large oxygen partial pressure difference is present at both sides of the electrolyte layer 20, it is required to maintain the above properties in a broad oxygen partial pressure range.

The fuel electrode layer 10 may be sintered with the electrolyte layer 20 at the same time.

Preferably, a fuel electrode functional layer (not shown) may be further incorporated between the fuel electrode layer 10 and the electrolyte layer 20 so as to accelerate the electrochemical reaction of fuel.

The first diffusion barrier layer 30 is formed on the electrolyte layer and may include a sintered ceria-based oxide containing no sintering aid. The ceria-based metal oxide may include a sintered product of nanopowder and macropowder.

The sintered product of nanopowder may be present in an amount of 5-50 wt % based on the total weight of the first diffusion barrier layer.

The second diffusion barrier layer 40 is formed on the first diffusion barrier layer 30 and may include a sintered product of a ceria-based metal oxide mixed with a sintering aid.

The first diffusion barrier layer 30 and the second diffusion barrier layer 40 have a dense structure and high ion conductivity. Thus, when they are disposed between the electrolyte layer 20 and the air electrode layer 40, they prevent diffusion of elements between both layers to inhibit formation of insulating reaction products.

The sintering aid may include at least one selected from Co, Fe, Ni, Zn, Cu, Mn and Li or an oxide thereof.

The sintering aid may be present in an amount of 0.05-5 wt % based on the total weight of the second diffusion barrier layer 40. When the sintering aid is present in an amount less than 0.05 wt %, no liquid phase is formed and the diffusion barrier layer may not be densified. Thus, it is not possible to inhibit chemical reaction between the air electrode layer 50 and the electrolyte layer 20, resulting in degradation of the quality and stability of a fuel cell. In addition, when the sintering aid is present in an amount larger than 5 wt %, a liquid phase is formed in an excessively large amount to form a reactive layer with the electrolyte layer, resulting in degradation of the quality of a fuel cell.

Further, the ceria-based metal oxide may include at least one selected from the group consisting of oxides of gadolinium (Gd), samarium (Sm), yttrium (Y) and lanthanum (La).

Particularly, the ceria-based metal oxide may be represented by the following Chemical Formula 1:

$$Ln_xCe_{1-x}O_{2-0.5x}$$ [Chemical Formula 1]

wherein Ln is any one selected from the group consisting of gadolinium (Gd), samarium (Sm), yttrium (Y) and lanthanum (La), and x satisfies 0<x=0.4.

The first diffusion barrier layer 30 and the second diffusion barrier layer 40 are sintered at the same time.

The second diffusion barrier layer 40 may include a sintered product of nanopowder and macropowder of a ceria-based metal oxide.

The first diffusion barrier layer 30 and the second diffusion barrier layer 40 are formed between the air electrode layer and the electrolyte layer, and prevent La or Sr in the air electrode layer from reacting with the zirconia-based metal oxide in the electrolyte layer to produce an insulating reaction product, such as $La_2Zr_2O_7$ or $SrZrO_3$.

The solid oxide cell as described above is obtained by depositing the first diffusion barrier layer 30 including nanopowder and containing no sintering aid and the second diffusion barrier layer 40 containing a sintering aid, and then sintering both layers at 1000-1250° C. at the same time to densify the layers. The diffusion barrier layer 30 containing no sintering aid prevents the second diffusion barrier layer 40 containing a sintering aid from being in direct contact with the electrolyte, thereby inhibiting formation of secondary phases caused by chemical reaction.

In addition, the first diffusion barrier layer 30 controls the shrinking rate of a layer and inhibits rapid shrinking, thereby functioning to prevent generation of macropores at the interface and to ensure the interfacial binding force.

The macropowder controls a sintering rate through clustering so that the sintering rate may not be increased rapidly, and the nanopowder fills the vacant spaces between macropowder particles to increase the packing degree and driving force of sintering. In this manner, it is possible to improve the final density, while inducing formation of interfacial binding at low temperature to increase the interfacial binding force.

Meanwhile, the second diffusion barrier layer 40 includes a sintering aid, which allows free rearrangement of powder by forming a flowable liquid phase partially moving toward the lower layer so that the layer may be densified even at a temperature of 1250° C. or lower.

The air electrode layer 50 may use a metal oxide having a perovskite structure but the scope of the present disclosure is not limited thereto. Any materials used conventionally in the art may be used for the air electrode layer. The metal oxide having a perovskite structure is a mixed conductor material having ion conductivity and electron conductivity at the same time. Since the metal oxide has a high oxygen diffusion coefficient and charge transfer rate coefficient, electrochemical reaction may occur not only in the interface of three phases but also on the surface of the whole electrode. Thus, it is possible to reduce the operating temperature of a solid oxide cell by virtue of excellent electrode activity at low temperature. According to an embodiment, it is possible to use a perovskite type metal oxide including lanthanum (La), cobalt (Co), iron (Fe), or the like. In addition, the metal oxide preferably has porosity so that oxygen gas may be diffused well thereto.

FIG. 2 is a flow chart illustrating the method for manufacturing a solid oxide cell according to an embodiment. Hereinafter, the method for manufacturing a solid oxide cell will be explained with reference to FIG. 2.

First, a Fuel Electrode Support is Prepared (Step a).

Zirconia-based metal oxide powder, nickel oxide (NiO) powder and a pore-forming precursor (PMMA) powder are mixed and granules having a uniform particle diameter are obtained from the mixture through a dry sprayer. Then, a molding process is carried out to mold the granules into the fuel electrode support substrate. In this manner, it is possible to obtain the fuel electrode support.

Powder of raw materials that may be used for the fuel electrode support and an average particle size thereof are as follows. Zirconina-based metal oxide powder may have an average particle diameter of 0.1-1 μm, nickel oxide (NiO) powder may have an average particle diameter of 0.5-1.5 μm, and the pore-forming precursor powder may have an average particle diameter of 3-7 μm.

The powder of raw materials are subjected to milling for 10-15 hours, and then a plasticizer and binder are added thereto, followed by thorough mixing, thereby providing slurry. The slurry is passed through a dry sprayer to form circular granules, which are used for molding the fuel electrode support substrate. Preferably, circular granules having a particle diameter of 40-150 μm may be used. This is because when the fuel electrode support substrate is manufactured by using powder having a particle diameter smaller than 40 μm or larger than 150 μm, defects and cracks may be generated in the fuel electrode support during molding. Then, the fuel electrode support is annealed at 150-250° C. for 3-8 hours to evaporate the added plasticizer and to increase the mechanical strength.

Next, an Electrolyte Layer is Formed on the Fuel Electrode Support (Step b).

The electrolyte layer may be formed by coating a paste on the fuel electrode support, followed by drying and sintering. The coating may be carried out preferably by screen printing, tape casting, chemical vapor deposition, electrochemical vapor deposition or sputtering. More preferably, the coating may be carried out by screen printing.

Optionally, a step of forming a fuel electrode functional layer may be further carried out before the electrolyte layer is coated on the fuel electrode support. The fuel electrode functional layer may be formed by coating, drying and sintering a paste containing the corresponding materials.

Then, the Fuel Electrode Support and the Electrolyte Layer are Sintered at the Same Time (Step c).

The fuel electrode support and the electrolyte layer are sintered at the same time at 1300-1400° C. to form a dense electrolyte layer.

Then, a Paste Including Nanopowder and Macropowder of Ceria-Based Metal Oxide is Coated on the Electrolyte Layer to Form a First Coating Layer (Step d).

The paste is characterized in that includes no sintering aid.

The coating may be carried out in the same manner as the coating of the electrolyte layer, and thus detailed description thereof will be omitted herein. After coating, the paste is dried. Any separate sintering step is not carried out but co-sintering is carried out after coating a second coating layer subsequently.

The nanopowder is present preferably in an amount of 5-50 wt %, more preferably in an amount of 20-40 wt %, based on the total weight of the first coating layer.

The nanopowder may have an average particle diameter of 10-100 nm, preferably 10-50 nm, and more preferably 10-30 nm.

The macropowder may have an average particle diameter of 100 nm or more, preferably 100 nm-1 μm, and more preferably 100 nm-500 nm.

The first coating layer may have a thickness of 1-10 μm, preferably 2-8 μm and more preferably 3-6 μm.

Then, a Mixed Paste Including a Ceria-Based Metal Oxide and a Sintering Aid is Coated on the First Coating Layer to Form a Second Coating Layer (Step e).

The ceria-based metal oxide is preferably a mixture of nanopowder with macropowder, wherein the nanopowder is present preferably in an amount of 5-50 wt %, more preferably in an amount of 20-40 wt %, based on the total weight of the second coating layer.

The sintering aid is the same as described hereinabove with reference to the metal oxide cell and the corresponding description part refers to particular description of the sintering.

The sintering aid is present preferably in an amount of 0.05-5 wt %, more preferably 20-40 wt %, based on the total weight of the second coating layer.

Then, the First Coating Layer and the Second Coating Layer are Sintered at the Same Time to Obtain a Bilayer Type Diffusion Barrier Layer Including a First Diffusion Barrier Layer and a Second Diffusion Barrier Layer Formed on the First Diffusion Barrier Layer (Step f).

The sintering may be carried out preferably at a temperature of 1000-1250° C.

In the sintering step, the sintering temperature is 1000-1250° C. When the sintering temperature is lower than 1000° C., the diffusion barrier layer cannot be sintered sufficiently so that it has a porous structure and shows poor interfacial binding force. When the sintering temperature is higher than 1250° C., chemical reaction occurs to form a reactive layer containing insulating reaction products, resulting in degradation of the quality of a cell.

Finally, an Air Electrode Layer is Formed on the Bilayer Type Diffusion Barrier Layer (Step g).

The air electrode layer may be formed by forming an air electrode functional layer on the second diffusion barrier layer and then forming an air electrode current collector layer on the air electrode functional layer.

The examples and experiments will now be described in more detail with reference to the accompanying drawings.

EXAMPLES

Powder Preparation Example 1

Preparation of GDC (Gadolinium Doped Ceria) Powder for First Diffusion Barrier Layer First, macropowder and 3 wt % of KD6 as a dispersant were introduced to deionized water and ball milling was carried out for 24 hours to prepare a macropowder solution. The resultant macropowder solution has the composition as shown in the following Table 1.

TABLE 1

| Ingredients | Amount (g) |
|---|---|
| GDC macropowder | 14 |
| D.I water | 100 |
| KD6 | 0.42 |

GNP (glycine-nitrate process) solution was prepared by mixing cerium nitrate hexahydrate, gadolinium nitrate hexahydrate and glycine with deionized water. The solution has the composition as shown in the following Table 2.

TABLE 2

| Ingredients | Amount (g) |
|---|---|
| Cerium nitrate hexahydrate | 13.625 |
| Gadolinium nitrate hexahydrate | 1.575 |
| Glycine | 4.318 |
| Deionized water | 60 |

The resultant GNP solution was mixed with the macropowder solution by using a magnetic stirrer for 1 hour. Then, the mixed solution was introduced to a container heated to 400° C. or higher and fired. After that, powder was collected and sieved through a 100 μm sieve, followed by calcination at 600° C. for 2 hours. The calcined powder was milled again through dry ball milling and sieved through a 100 μm sieve to obtain GDC powder. The resultant GDC powder included nanopowder and macropowder at a weight ratio of 3:7.

Powder Preparation Example 2

GDC (Gadolinium Doped Ceria) Powder for Second Diffusion Barrier Layer Containing Cobalt (Co) as Sintering Aid Preparation Example 1 was repeated except the composition of ingredients to obtain a macropowder solution. The composition of ingredients is shown in the following Table 3.

TABLE 3

| Ingredients | Amount (g) |
|---|---|
| GDC macropowder | 14 |
| D.I water | 100 |
| KD6 | 0.42 |

In addition, cobalt-containing GNP solution was prepared in the same manner as the preparation of the GNP solution in Preparation Example 1, except that cobalt nitrate was further incorporated. The composition is shown in the following Table 4.

TABLE 4

| Ingredients | Amount (g) |
|---|---|
| Cerium nitrate hexahydrate | 13.625 |
| Gadolinium nitrate hexahydrate | 1.575 |
| Cobalt nitrate | 1.008 |
| Glycine | 4.604 |
| D.I water | 60 |

The GNP solution and macropowder solution were treated in the same manner as Preparation Example 1 to obtain GDC powder containing 1 wt % of cobalt. The resultant GDC powder included nanopowder and macropowder at a weight ratio of 3:7. In addition, the GDC powder included 1 wt % of cobalt based on the total weight of GDC powder.

Powder Preparation Example 3

Preparation of GDC Nanopowder

Nanopowder available from NexTech Co. (average particle diameter: 30 nm or less) was prepared.

Powder Preparation Example 4

Preparation of GDC Macropowder

Nanopowder available from Rhodia Co. (average particle diameter: 100 nm or more) was prepared.

Powder Preparation Example 5

Preparation of Co-Containing GDC Macropowder

Nanopowder available from Rhodia Co. (average particle diameter: 100 nm or more) was mixed with 1 wt % of cobalt in its oxide form to prepare macropowder.

Paste Preparation Example 1

Preparation of Paste for First Diffusion Barrier Layer

To an 80 mL nylon bowl, 3 wt % of KD6, α-terpineol, borazane (BH$_3$) and butyl phthalate were introduced together with zirconia balls. Then, the GDC powder obtained according to Preparation Example 1 was added thereto in a divided amount of 25% with an interval of 1 hour while the mixture was milled. The milling was carried out by using a planetary milling machine under 140 rpm. After all the GDC powder was added, the mixture was milled for 24 hours and a binder and plasticizer were added thereto. Then, milling was further carried out under 220 rpm for 24 hours to obtain a paste for preparing a first diffusion barrier layer. The composition of the paste for preparing a first diffusion barrier layer is shown in the following Table 5.

TABLE 5

| Ingredients | Amount (g) |
|---|---|
| GDC powder according to Preparation Example 1 | 8.00 |
| α-terpineol | 7.27 |

TABLE 5-continued

| Ingredients | Amount (g) |
|---|---|
| KD6 | 0.24 |
| BH$_3$ | 0.40 |
| DBP | 0.15 |

Paste Preparation Example 2

Preparation of Paste for Second Diffusion Barrier Layer

A paste for preparing a second diffusion barrier layer was prepared in the same manner as Paste Preparation Example 1, except that the cobalt-containing GDC powder according to Preparation Example 2 was used instead of the GDC powder according to Preparation Example 1. The composition of the paste for preparing a second diffusion barrier layer is shown in the following Table 6.

TABLE 6

| Ingredients | Amount (g) |
|---|---|
| GDC | 8.00 |
| α-terpineol | 7.27 |
| KD6 | 0.24 |
| BH$_3$ | 0.40 |
| DBP | 0.15 |

Paste Preparation Example 3

Preparation of GDC Nanopowder Paste

A paste for preparing a diffusion barrier layer was prepared in the same manner as Paste Preparation Example 1, except that the GDC nanopowder according to Preparation Example 3 was used instead of Preparation Example 1.

Paste Preparation Example 4

Preparation of GDC Macropowder Paste

A paste for preparing a diffusion barrier layer was prepared in the same manner as Paste Preparation Example 1, except that the GDC macropowder according to Preparation Example 4 was used instead of Preparation Example 1.

Paste Preparation Example 5

Preparation of Co-Containing GDC Macropowder Paste

A paste for preparing a diffusion barrier layer was prepared in the same manner as Paste Preparation Example 1, except that the Co-containing GDC macropowder according to Preparation Example 5 was used instead of Preparation Example 1.

Paste Preparation Example 6

Preparation of Paste for Air Electrode Functional Layer

A paste for preparing an air electrode functional layer was prepared in the same manner as Preparation Example 3, except that lanthanum-strontium-cobalt-ferric oxide (LSCF) powder was used instead of the GDC powder according to Preparation Example 1. The composition of the paste is shown in the following Table 7.

TABLE 7

| Ingredients | Amount (g) |
|---|---|
| LSCF | 25.00 |
| α-terpineol | 16.00 |
| KD6 | 0.25 |
| BH$_3$ | 0.50 |
| DBP | 0.25 |

Paste Preparation Example 7

Preparation of Paste for Air Electrode Current Collector Layer

A paste for preparing an air electrode current collector layer was prepared in the same manner as Preparation Example 3, except that lanthanum-strontium-cobalt-ferric oxide (LSCF) powder was added to the paste. The composition of the paste is shown in the following Table 8.

TABLE 8

| Ingredients | Amount (g) |
|---|---|
| LSCF | 12.50 |
| GDC | 12.50 |
| α-terpineol | 16.00 |
| KD6 | 0.50 |
| BH$_3$ | 0.50 |
| DBP | 0.32 |

Example 1

Manufacture of Diffusion Barrier Layer

The paste according to Paste Preparation Example 1 was applied onto a commercially available anode/yttria-stabilized zirconia (YSZ) electrolyte substrate by a screen printing process to form a lower paste layer to a thickness of about 3 μm. Next, the lower paste layer was dried at room temperature for 30 minutes and at 60° C. in an oven for 1 hour. Then, the paste according to Paste Preparation Example 2 was applied onto the lower paste layer to form an upper paste layer to a thickness of about 3 μm, and the upper paste layer was dried under the same drying condition as the lower paste layer. After that, an electric furnace was used to carry out sintering of the upper layer and the lower layer at the same time to obtain a bilayer type diffusion barrier layer.

Comparative Example 1

Manufacture of GDC Nanopowder Monolayer Type Diffusion Barrier Layer

A diffusion barrier layer was manufactured in the same manner as Example 1, except that a monolayer type diffusion barrier layer was formed to a thickness of about 5 μm by using the paste according to Paste Preparation Example 3 and sintered at 1250° C.

Comparative Example 2

Manufacture of GDC Macropowder Monolayer Type Diffusion Barrier Layer

A diffusion barrier layer was manufactured in the same manner as Example 1, except that a monolayer type diffusion barrier layer was formed to a thickness of about 5 μm by using the paste according to Paste Preparation Example 4.

Comparative Example 3

Manufacture of Co-Containing GDC Macropowder Monolayer Type Diffusion Barrier Layer A diffusion barrier layer was manufactured in the same manner as Example 1, except that a monolayer type diffusion barrier layer was formed to a thickness of about 5 μm by using the Co-containing macropowder paste according to Paste Preparation Example 5.

Comparative Example 4

Manufacture of Mixed GDC Nanopowder/Macropowder Monolayer Type Diffusion Barrier Layer A diffusion barrier layer was manufactured in the same manner as Example 1, except that a monolayer type diffusion barrier layer was formed to a thickness of about 5 μm by using a mixed paste of nanopowder with macropowder according to Paste Preparation Example 1.

Comparative Example 5

Manufacture of Mixed Co-Containing GDC Nanopowder/Macropowder Monolayer Type Diffusion Barrier Layer A diffusion barrier layer was manufactured in the same manner as Example 1, except that a monolayer type diffusion barrier layer was formed to a thickness of about 5 μm by using a mixed paste of Co-containing nanopowder with macropowder according to Paste Preparation Example 2.

Comparative Example 6

Manufacture of Bilayer Type Diffusion Barrier Layer Including Lower Layer Containing No Nanopowder A bilayer type diffusion barrier layer was manufactured in the same manner as Example 1, except that a lower layer was formed by using the macropowder paste according to Paste Preparation Example 4 instead of Paste Preparation Example 1.

Comparative Example 7

Manufacture of Bilayer Type Diffusion Barrier Layer Through Separate Sintering A bilayer type diffusion barrier layer was manufactured in the same manner as Example 1, except that sintering of the lower layer of the diffusion barrier layer and sintering of the upper layer of the diffusion barrier layer were carried out separately.

Device Example 1

After sintering the diffusion barrier layer, the paste according to Paste Preparation Example 6 was applied four times onto the diffusion barrier layer by a screen printing process to form an air electrode functional layer. Then, the paste according to Preparation Example 7 was applied four times thereon by a screen printing process to form an air electrode current collector layer. Herein, after each application, planarization of the paste was carried out at room temperature for 30 minutes and the paste was dried at 60° C. in an oven for about 2 hours. After that, the air electrode was sintered at 1050° C. to obtain a solid oxide cell with an area of 5 cm×5 cm.

Device Comparative Example 1

A solid oxide cell was obtained in the same manner as Device Example 1, except that a diffusion barrier layer was formed according to Comparative Example 1.

Device Comparative Example 2

A solid oxide cell was obtained in the same manner as Device Example 1, except that a diffusion barrier layer was formed according to Comparative Example 2.

Device Comparative Example 3

A solid oxide cell was obtained in the same manner as Device Example 1, except that a diffusion barrier layer was formed according to Comparative Example 3.

Test Examples

Test Example 1

Determination of Structure of Diffusion Barrier Layer

Figure 3A:
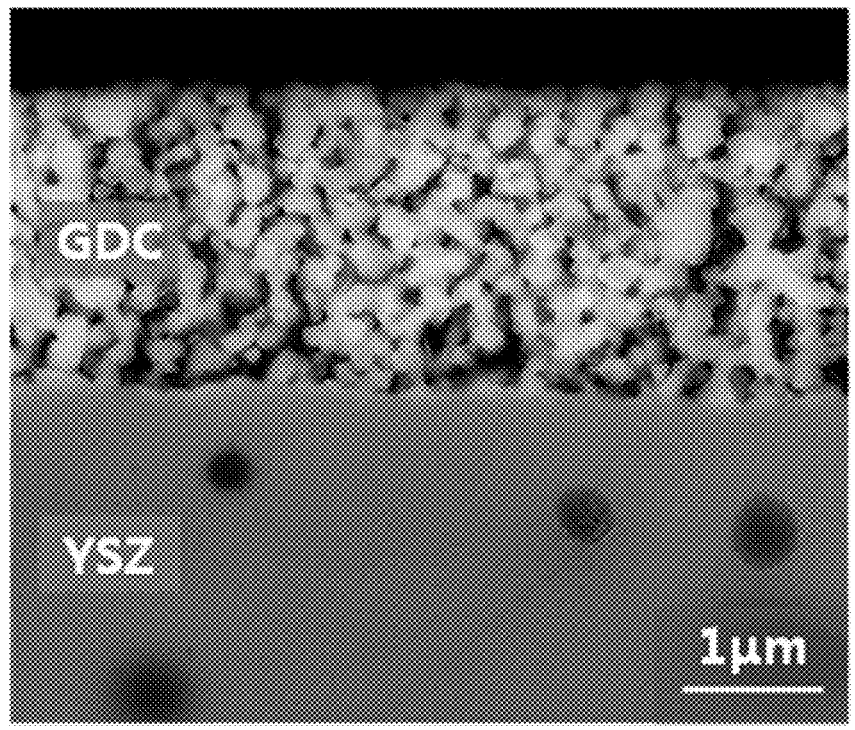
FIG. 3A shows the diffusion barrier layer according to Comparative Example 2.
Figure 3B:
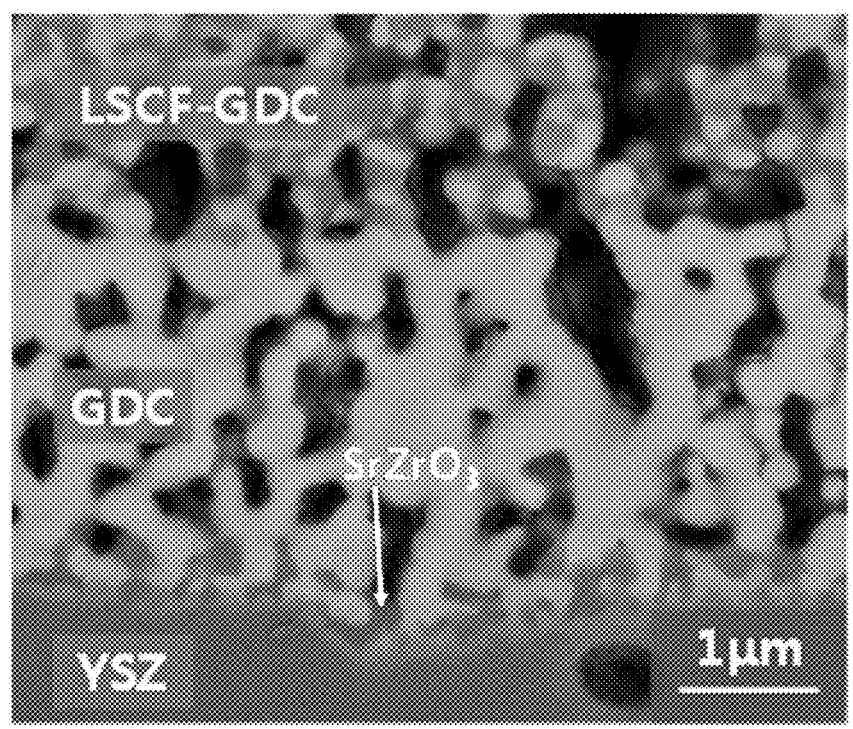
FIG. 3B shows scanning electron microscopic (SEM) image of the solid oxide cell according to Device Comparative Example 2.

FIG. 3 shows a scanning electron microscopic (SEM) image or transmission electron microscopic (TEM) image illustrating the lateral sections of the monolayer type diffusion barrier layer including the conventional GDC macropowder and the solid oxide cell using the same Particularly, FIG. 3(A) shows an SEM image of the lateral section of the GDC diffusion barrier layer on YSZ electrolyte according to Comparative Example 2. In addition, FIG. 3(B) shows an SEM image of the solid oxide cell according to Device Comparative Example 2, wherein Sr transferred from the LSCF air electrode reacts with Zr of the electrolyte to form a large amount of $SrZrO_3$ on the interface between the electrolyte and the diffusion barrier layer.

Figure 3C:
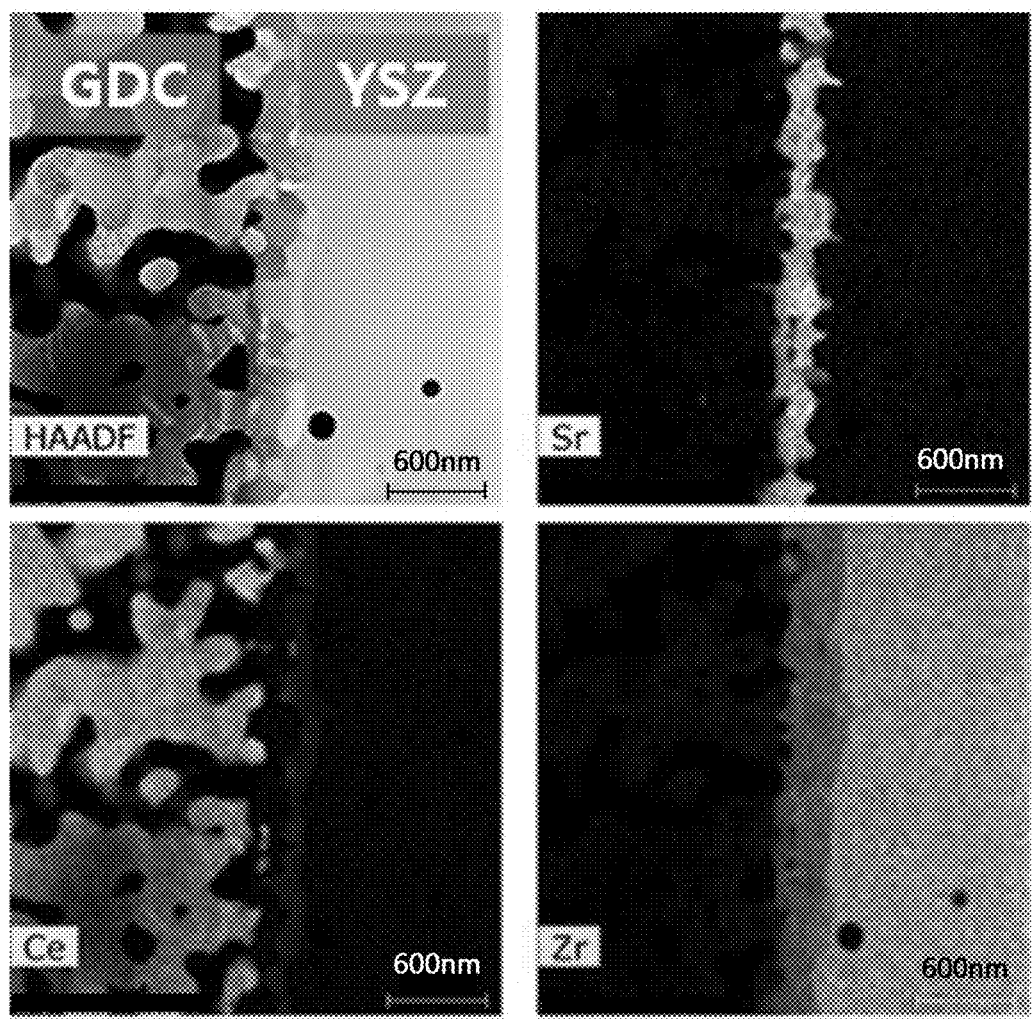
FIG. 3C shows transmission electron microscopic (TEM) image of the solid oxide cell according to Device Comparative Example 2.
Figure 3D:
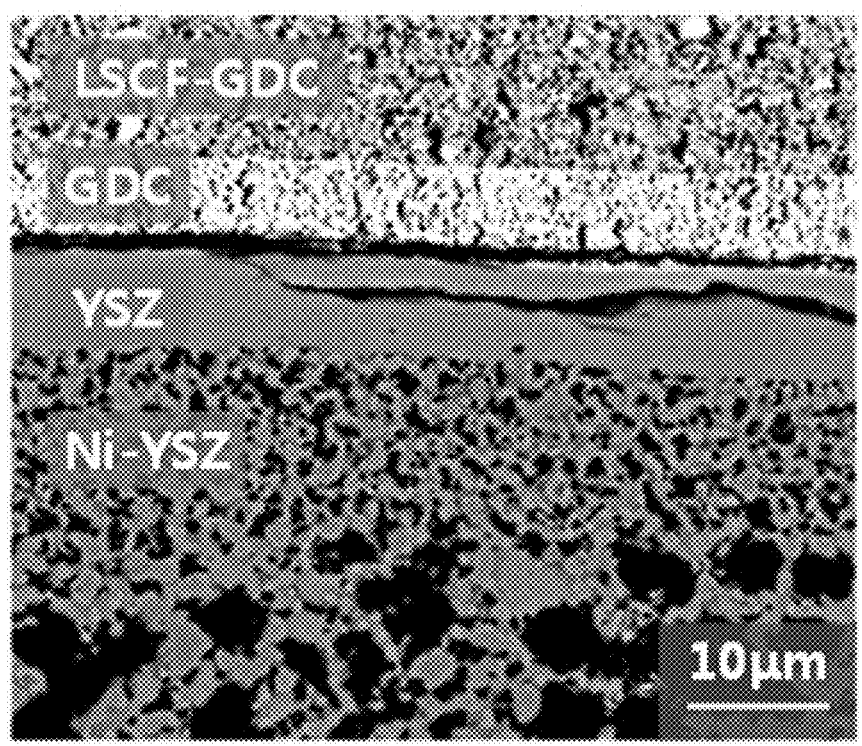
FIG. 3D shows SEM image of the solid oxide cell according to Device Comparative Example 2.

Further, FIG. 3(C) shows a TEM image illustrating the $SrZrO_3$ layer formed between the electrolyte layer and the diffusion barrier layer in the solid oxide cell according to Device Comparative Example 2. FIG. 3(D) shows an SEM image illustrating the interface between the electrolyte and the diffusion barrier layer damaged by the $SrZrO_3$ layer in the solid oxide cell according to Device Comparative Example 2. It can be seen that the $SrZrO_3$ layer formed between the electrolyte and the diffusion barrier layer causes degradation of the quality and thermal stability of a solid oxide cell and destroys the interface between the electrolyte and the diffusion barrier layer.

Figure 4A:
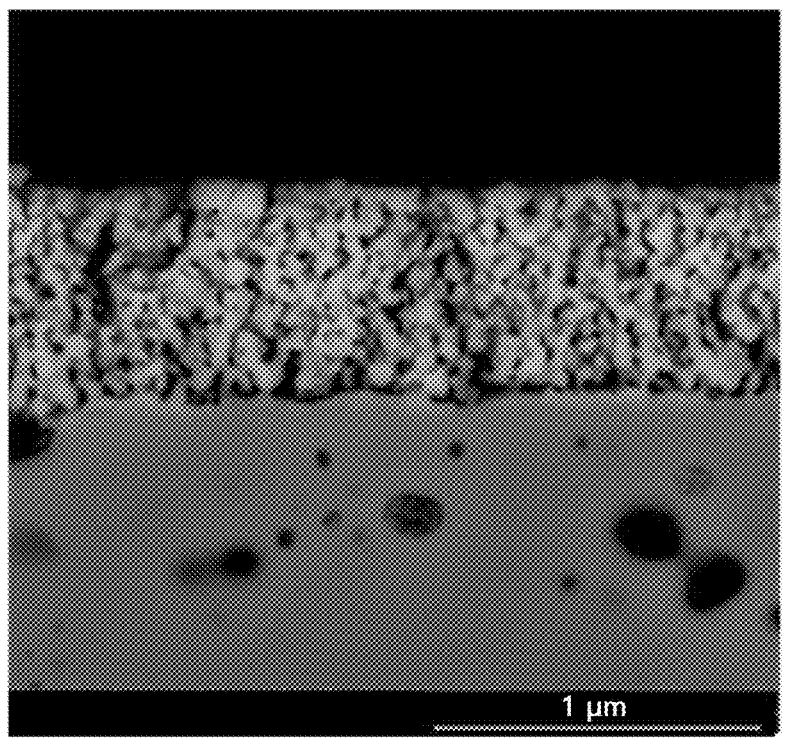
FIG. 4A shows lateral SEM images of the diffusion barrier layer according to Comparative Example 1.

FIG. 4(A) shows an SEM image of the diffusion barrier layer according to Comparative Example 1. According to FIG. 4(A), a sufficient degree of sintering was not obtained despite the use of nanopowder having an average particle diameter of 30 nm or less, and a large amount of pores was still present. Therefore, it can be seen from the above result that it is not possible to densify a diffusion barrier layer at a temperature of 1250° C. merely by reducing the size of metal oxide powder.

Figure 4B:
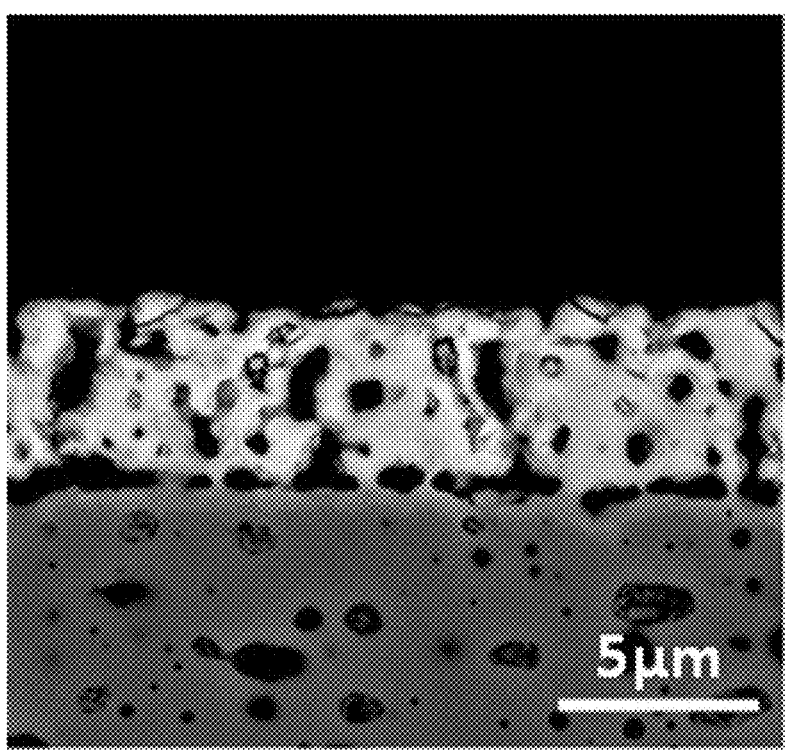
FIG. 4B shows the diffusion barrier layer according to Comparative Example 3.
Figure 4C:
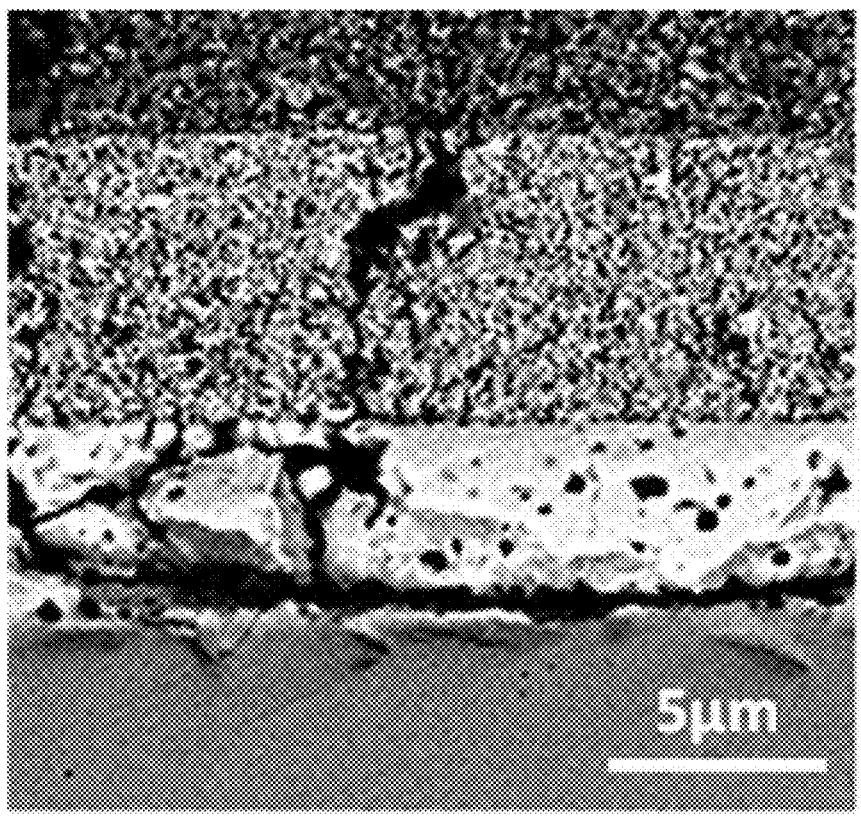
FIG. 4C shows the solid oxide cell according to Device Comparative Example 3.

FIG. 4(B) shows an SEM image of the diffusion barrier layer according to Comparative Example 3 and FIG. 4(C) shows an SEM image of the solid oxide cell according to Device Comparative Example 3 after the evaluation thereof. According to FIG. 4(B) and FIG. 4(C), the diffusion barrier layer containing cobalt causes an increase in sintering degree due to liquid phase sintering and local formation of a significantly densified structure. However, as the sintering proceeds rapidly in the diffusion barrier layer before interfacial binding is formed, the interfacial structure becomes significantly weak. In addition, since the sintering rate is not uniform, large pores are formed in the vertical direction at a portion having a relatively lower sintering rate. Further, when a sintering aid is incorporated, the reactivity between the diffusion barrier layer (GDC) and the electrolyte layer (YSZ) is increased to cause severe interdiffusion at the interface, resulting in an increase in the resistance of a cell. When applying the diffusion barrier layer having such a structure to a cell, the cell shows poor quality due to the interfacial reactants. In addition, as shown in the drawings, interfacial separation and vertical destruction occur. Therefore, it can be seen from the above result that it is not possible to obtain a densified and stable diffusion barrier layer merely by adding a sintering aid.

FIG. 5(A), FIG. 5(B), FIG. 5(C) and FIG. 5(D) show lateral sectional SEM images of the diffusion barrier layers according to Comparative Example 2, Comparative Example 4, Comparative Example 5 and Example 1, respectively.

According to FIG. 5, the diffusion barrier layers according to Comparative Examples 2 and 4 include no sintering aid and have an insufficient degree of sintering, and thus show a large amount of pores present therein. Meanwhile, in the case of the monolayer to which cobalt is added according to Comparative Example 5, the density of layer is increased locally but many vertical large pores and interfacial processing defects are present. On the contrary, the diffusion barrier layer according to Example 1 shows no processing defects, has high interfacial binding force and demonstrates formation of a significantly densified diffusion barrier layer.

Figure 5A:
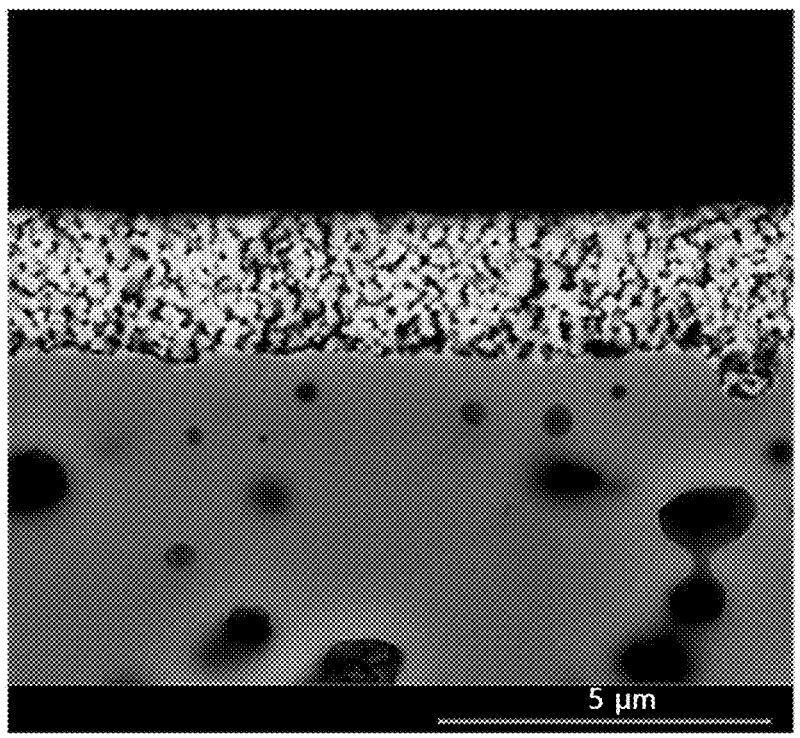
FIG. 5A shows a lateral sectional SEM image of the diffusion barrier layers according to Comparative Example 2.
Figure 5B:
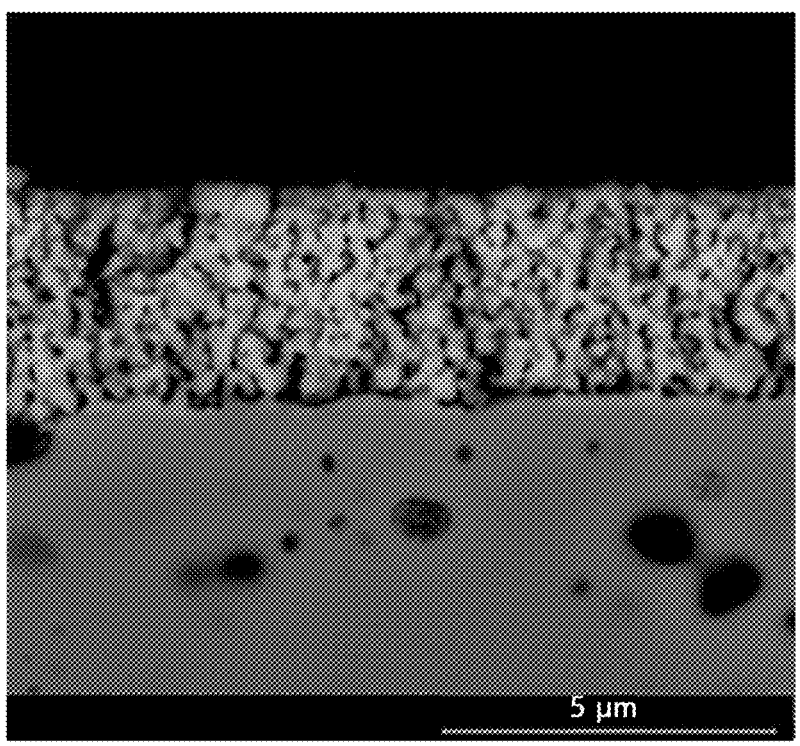
FIG. 5B shows a lateral sectional SEM image of the diffusion barrier layers according to Comparative Example 4.
Figure 5C:
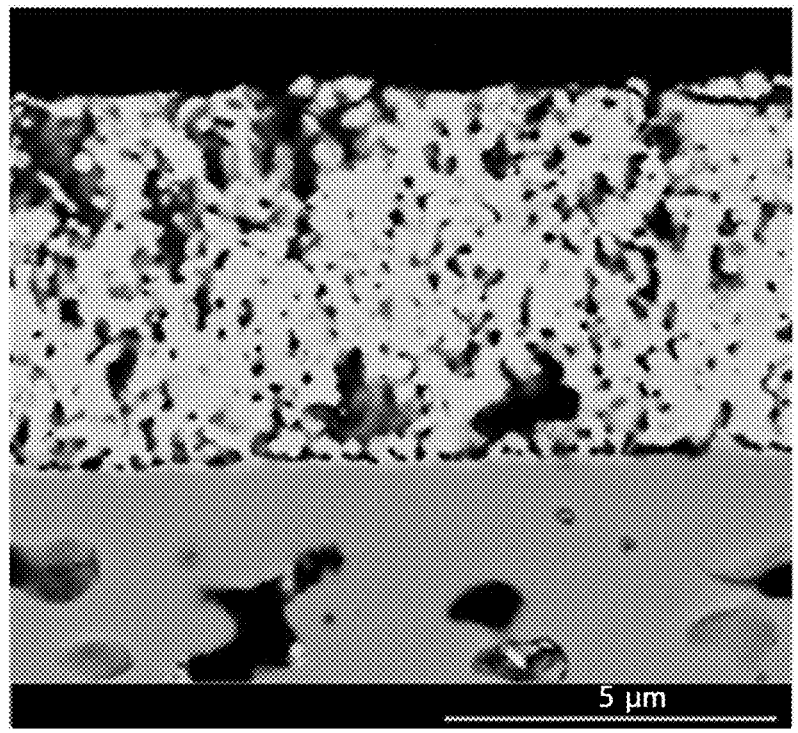
FIG. 5C shows a lateral sectional SEM image of the diffusion barrier layers according to Comparative Example 5.
Figure 5D:
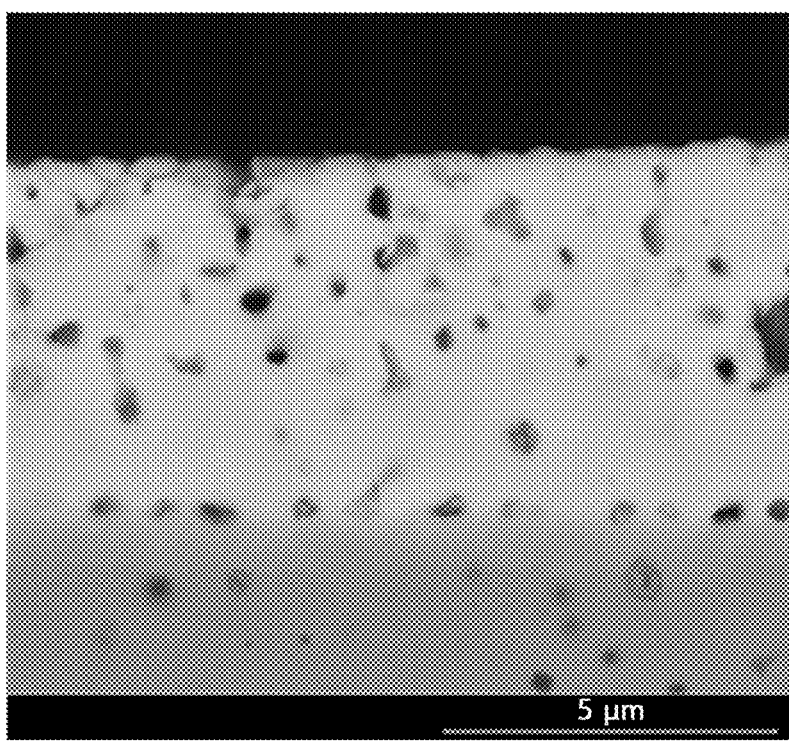
FIG. 5D shows a lateral sectional SEM image of the diffusion barrier layers according to Example 1.
Figure 6:
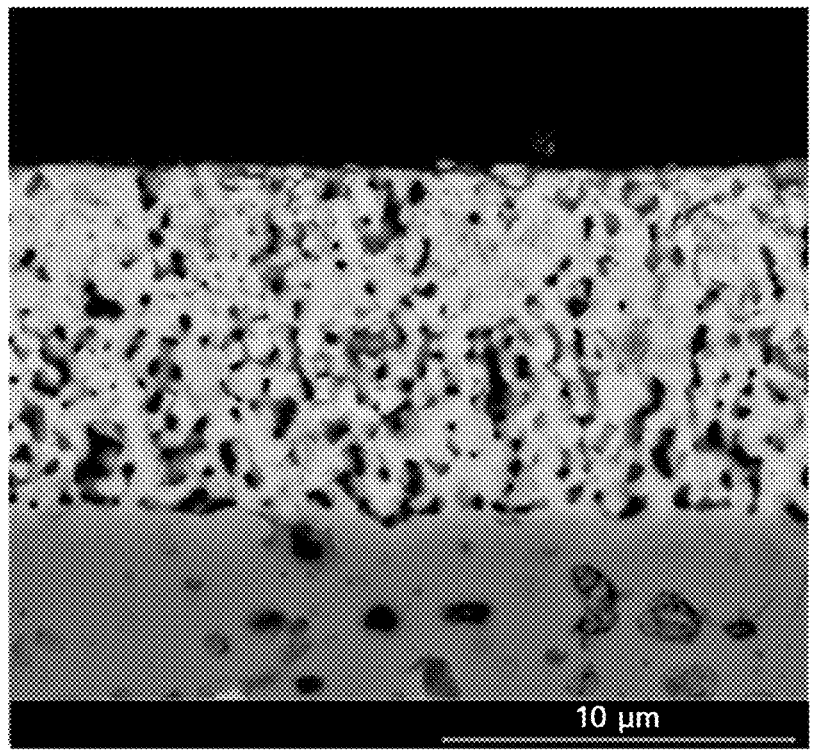
FIG. 6 shows the lateral sectional SEM image of the diffusion barrier layer according to Comparative Example 7.

FIG. 6 shows an SEM image of the diffusion barrier layer according to Comparative Example 7. According to FIG. 6, it is possible to observe a microstructure formed by depositing a lower layer including a mixture of macropowder with nanopowder at a ratio of 7:3, sintering the lower layer at 1200° C., further depositing an upper layer containing Co as a sintering aid, and further sintering the upper layer at 1200° C. When the upper layer and the lower layer are sintered separately as mentioned above, additional sintering of the lower layer is limited due to the sintering aid of the upper layer, and thus a significantly larger amount of residual pores is present as compared to the diffusion barrier layer formed by co-sintering of both layers according to Example 1 as shown in FIG. 5(D). Therefore, it can be seen from the above result that Example 1 in which the upper layer and the lower layer are sintered at the same time after they are deposited forms a diffusion barrier layer having a densified structure.

Figure 7:
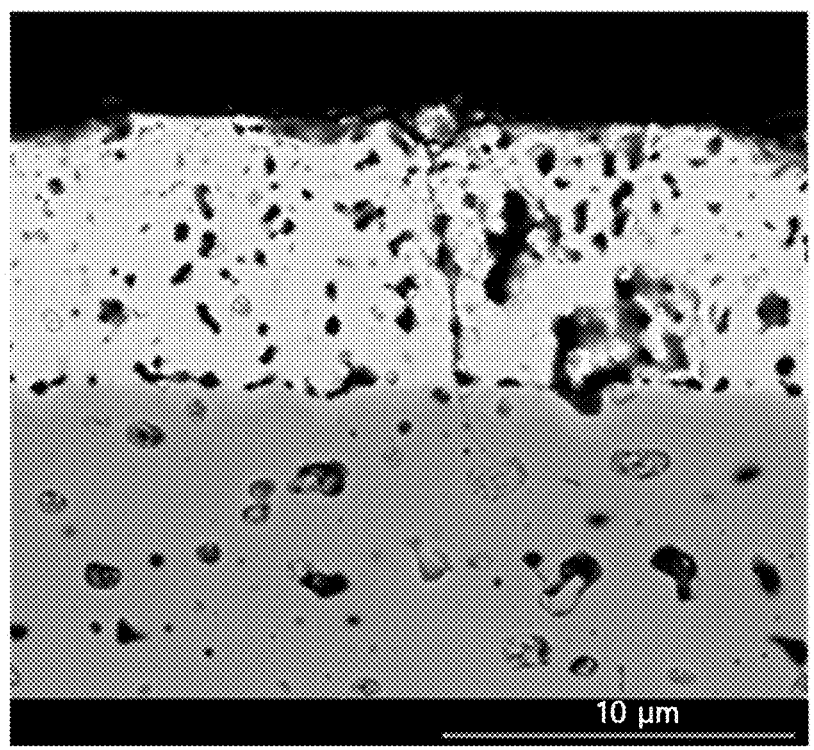
FIG. 7 shows the lateral sectional SEM image of the diffusion barrier layer according to Comparative Example 6.

FIG. 7 shows a lateral sectional SEM image of the barrier according to Comparative Example 6. According to FIG. 7, the microstructure of the diffusion barrier layer formed by depositing a lower layer including macropowder alone and an upper layer containing 1 wt % of Co as a sintering aid and carrying out sintering at 1200° C. When the lower layer includes no nanopowder, a larger amount of pores remains in the layer and a relatively larger amount of pores is formed at the interface as compared to Example 1 (FIG. 5(D)). The nanopowder contained in the lower layer increases the packing density and improves the sintering driving force, thereby accomplishing densification of the layer and contributing to formation of interfacial binding.

Test Example 2

Determination of Appearance of Diffusion Barrier Layer

Figure 8:
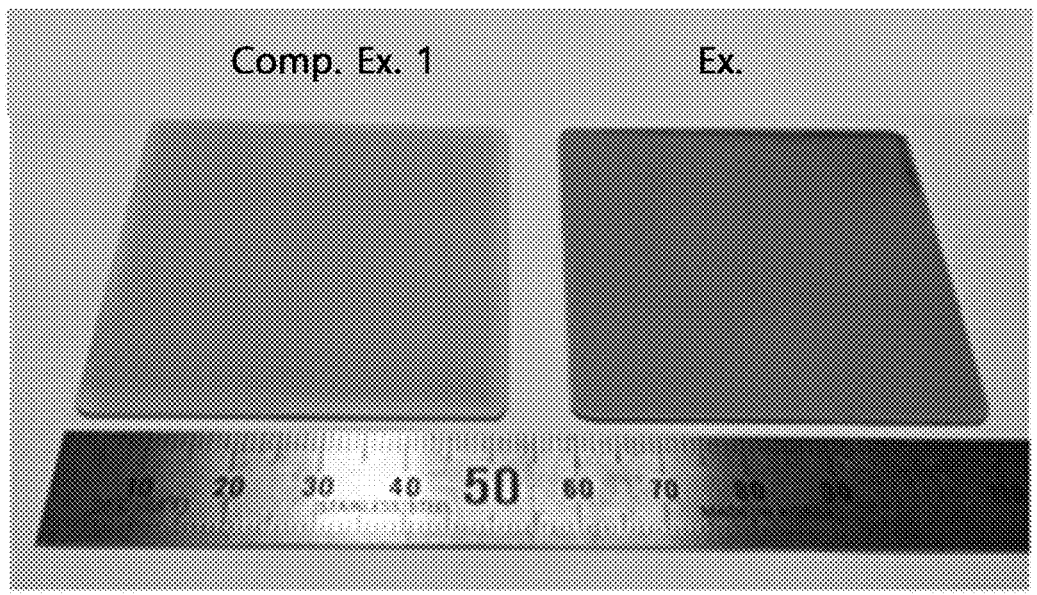
FIG. 8 shows the images of diffusion barrier layers according to Comparative Example 1 and Example 1.

FIG. 8 shows images of the diffusion barrier layers according to Comparative Example 1 and Example 1. Referring to FIG. 8, the conventional diffusion barrier layer according to Comparative Example 1 shows an opaque white color due to the presence of a large amount of pores in the layer. However, it can be seen by the naked eyes that use of a bilayer structure forms a densified layer which looks transparent.

Test Example 3

Long-Term Evaluation of Solid Oxide Cell

Figure 9:
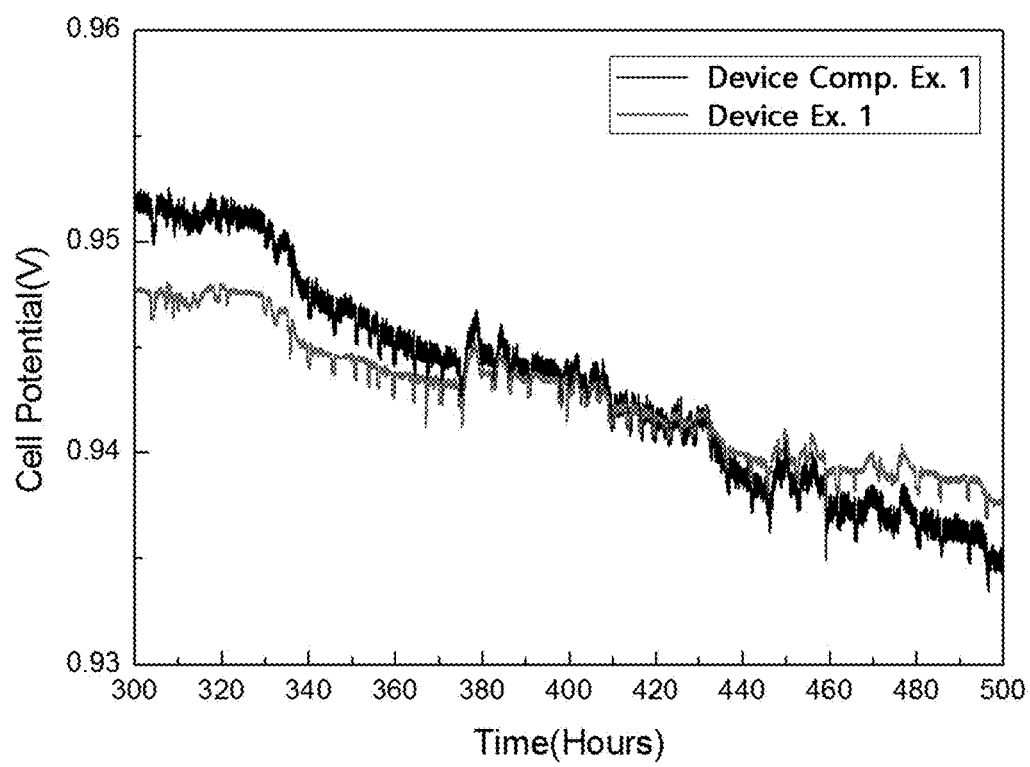
FIG. 9 shows the long-terms test results of the solid oxide cells according to Device Example 1 and Device Comparative Example 1.

FIG. 9 shows the long-term evaluation results of the solid oxide cells according to Device Example 1 and Device Comparative Example 2 at 800° C.

According to FIG. 9, it can be seen that the solid oxide cell including a bilayer type densified diffusion barrier layer according to Device Example 1 inhibits chemical reaction between the air electrode and the electrolyte and undergoes deterioration more slowly as compared to the solid oxide cell according to Device Comparative Example 2.

Figure 10A:
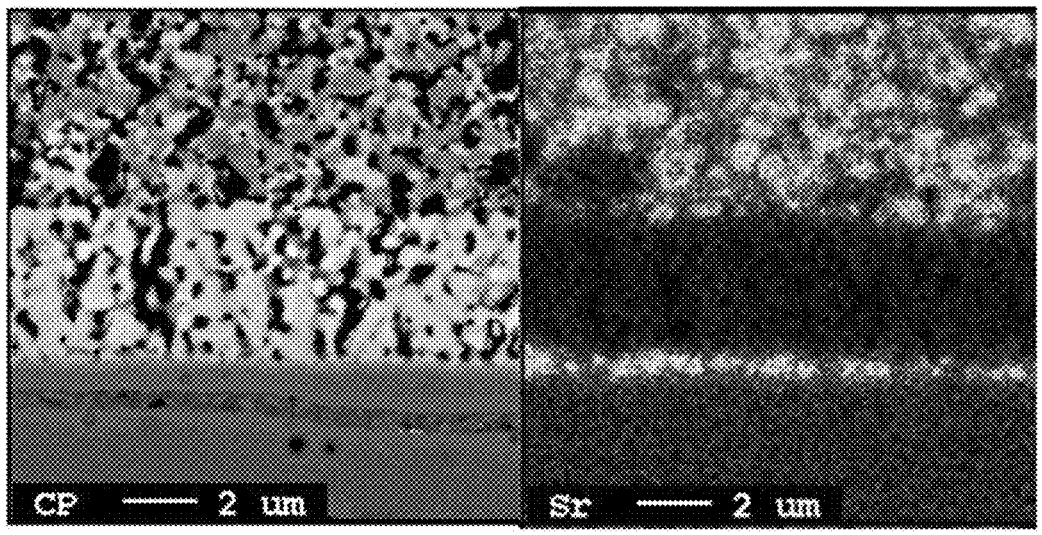
FIG. 10A shows the structure and chemical analysis result of the solid oxide cells according to Device Example 1.
Figure 10B:
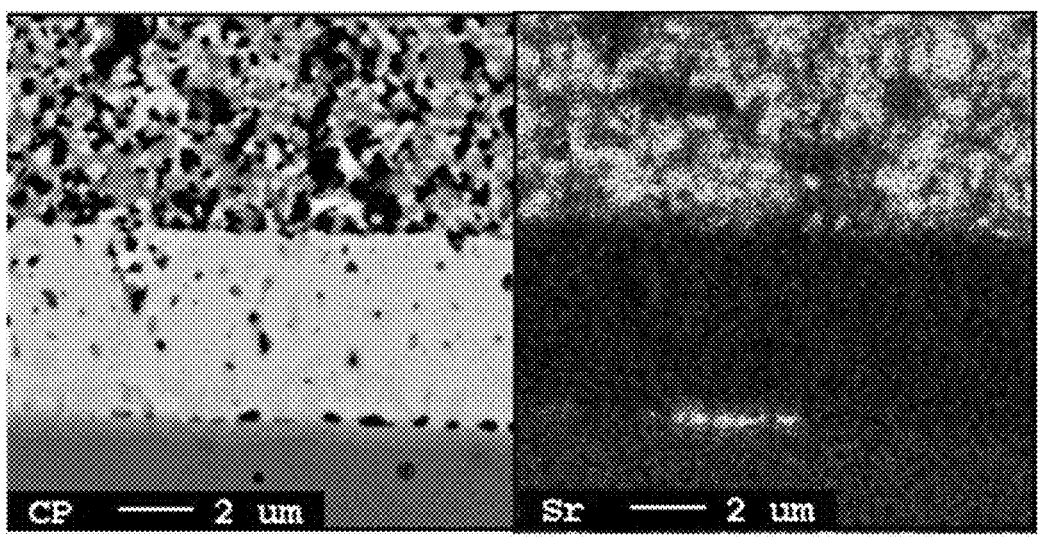
FIG. 10B shows the structure and chemical analysis result of the solid oxide cells according to Device Comparative Example 1 after a long-term test.

FIG. 10 shows the structures and chemical analysis results of the diffusion barrier layers in the solid oxide cells according to Device Example 1 and Device Comparative Example 2, taken by SEM and TEM image analysis after the long-term evaluation thereof.

According to FIG. 10, the diffusion barrier layer according to Device Comparative Example 2 had many pores and a large amount of Sr was detected at the interface between the diffusion barrier layer and the electrolyte. On the contrary, the bilayer type diffusion barrier layer according to Device Example 1 was significantly densified and Sr was not detected at the interface. Therefore, it can be seen from the long-term evaluation and post-analysis results that the bilayer type diffusion barrier layer effectively prevents Sr from being transferred from the air electrode during the manufacture and operation of a cell, thereby providing improved long-term stability.

While the present disclosure has been described with respect to the specific embodiments, it will be apparent to those skilled in the art that various changes and modifications may be made without departing from the spirit and scope of the disclosure as defined in the following claims.

What is claimed is:

1. A method for manufacturing a solid oxide cell, comprising the steps of:
   (a) preparing a fuel electrode support;
   (b) coating an electrolyte layer on the fuel electrode support;
   (c) sintering the fuel electrode support and the electrolyte layer at the same time;
   (d) coating a paste containing nanopowder and macropowder of a ceria-based metal oxide on the electrolyte layer to form a first coating layer;
   (e) coating a mixed paste containing a ceria-based metal oxide and a sintering aid on the first coating layer to form a second coating layer;
   (f) sintering the first coating layer and the second coating layer at the same time to provide a bilayer type diffusion barrier layer having a densified structure comprising a first diffusion barrier layer and a second diffusion barrier layer formed on the first diffusion barrier layer; and
   (g) forming an air electrode layer on the bilayer type diffusion barrier layer.

2. The method for manufacturing a solid oxide cell according to claim 1, wherein the nanopowder is present in an amount of 5-50 wt % based on the total weight of the first coating layer.

3. The method for manufacturing a solid oxide cell according to claim 1, wherein the nanopowder has an average particle diameter of 10-100 nm.

4. The method for manufacturing a solid oxide cell according to claim 1, wherein the macropowder has an average particle diameter of 100 nm-1 μm.

5. The method for manufacturing a solid oxide cell according to claim 1, which further comprises a step of forming a fuel electrode functional layer on the fuel electrode support, after step (a).

6. The method for manufacturing a solid oxide cell according to claim 1, wherein the ceria-based metal oxide contained in the second coating layer of step (e) is a mixture of nanopowder with macropowder.

7. The method for manufacturing a solid oxide cell according to claim 6, wherein the nanopowder is used in an amount of 5-50 wt % based on the total weight of the second coating layer.

8. The method for manufacturing a solid oxide cell according to claim 1, wherein the sintering aid is present in an amount of 0.05-5 wt % based on the total weight of the second coating layer.

9. The method for manufacturing a solid oxide cell according to claim 1, wherein the sintering of step (f) is carried out at a temperature of 1000-1250° C.

10. The method for manufacturing a solid oxide cell according to claim 1, wherein step (g) is carried out by forming an air electrode functional layer on the second diffusion barrier layer and then forming an air electrode current collector layer on the air electrode functional layer.

* * * * *